United States Patent
Armand et al.

(10) Patent No.: US 6,531,171 B2
(45) Date of Patent: Mar. 11, 2003

(54) FOOD PRODUCTS CONTAINING BETAINE

(75) Inventors: Andree Armand, Venice, CA (US);
Denise W. Lam, Irvine, CA (US);
Steve Rittmanic, Boca Raton, FL (US);
Samina Vanwinkle, Boca Raton, FL (US)

(73) Assignee: Nutricia USA, Inc., Boca Raton, FL (US)

( * ) Notice: Subject to any disclaimer, the term of this patent is extended or adjusted under 35 U.S.C. 154(b) by 0 days.

(21) Appl. No.: 09/897,084

(22) Filed: Jul. 3, 2001

(65) Prior Publication Data

US 2003/0017241 A1 Jan. 23, 2003

(51) Int. Cl.$^7$ .................... A23L 1/0562; A23L 1/305
(52) U.S. Cl. .................... 426/321; 426/656; 426/804
(58) Field of Search ................ 426/804, 321, 426/656

(56) References Cited

U.S. PATENT DOCUMENTS

| | | | |
|---|---|---|---|
| 2,437,150 A | 3/1948 | Berg | 99/83 |
| 3,202,514 A | 8/1965 | Burgess et al. | 99/2 |
| 3,434,843 A | 3/1969 | Durst | 99/1 |
| 4,118,512 A | 10/1978 | Eichelburg | 514/773 |
| 4,146,652 A | 3/1979 | Kahn et al. | 426/564 |
| 4,451,488 A | 5/1984 | Cook et al. | 426/89 |
| 4,605,561 A | 8/1986 | Lang | 426/93 |
| 4,990,356 A | 2/1991 | Hamilton et al. | 426/623 |
| 5,397,786 A | 3/1995 | Simone | 514/300 |
| 5,614,224 A | 3/1997 | Womack | 424/646 |
| 6,025,348 A | 2/2000 | Goto et al. | 514/182 |
| 6,139,897 A | 10/2000 | Goto et al. | 426/601 |

FOREIGN PATENT DOCUMENTS

GB 994267 6/1965

*Primary Examiner*—Helen Pratt
(74) *Attorney, Agent, or Firm*—Woodcock Washburn LLP

(57) ABSTRACT

The present invention is directed to food or nutritional products containing betaine. Also disclosed are methods for lowering the activity of water ($A_\omega$) and retarding microbial spoilage in an intermediate food or nutritional product, comprising including betaine and a humectant in said food or nutritional product.

69 Claims, No Drawings

FOOD PRODUCTS CONTAINING BETAINE

FIELD OF THE INVENTION

The invention relates to novel food or nutritional products. More particularly, the present invention relates to intermediate-moisture food products containing betaine that are particularly suitable for consumption by persons seeking to maintain a reduced carbohydrate diet.

BACKGROUND OF THE INVENTION

Prepared food or nutritional products such as food bars are well known and have been readily available for some time. They vary in composition, some having a marshmallow base while others, originally introduced as health food bars, often comprise grains, nuts, dried fruit, sweeteners and other ingredients. In the latter, the dried ingredients are generally mixed with a binder, such as sugar syrup, compressed into bars, and then cut to the desired length. Depending on their composition, the bars may be mixed, formed, and/or baked prior to packaging and sale.

Early food bars were typically hard and crunchy. Although the bars were generally moist when initially formed, within the first 24 to 48 hours following production, moisture from the sugar syrup would generally migrate to the dry ingredients of the bar. Subsequent crystallization of the sugars present in the syrup, primarily dextrose, caused the bars to harden, providing a dry, crunchy texture.

Simply increasing the moisture in the food bars fails to provide a satisfactory solution to the problem of poor texture, however. Although an increase in moisture may improve texture, high levels of moisture in food generally promote the growth of organisms such as yeasts, molds and bacteria, leading to microbiological spoiling and a shortened shelf life. Stabilization of food products through the use of traditional means such as freezing, or sterilization followed by hermetic sealing of the food product have known drawbacks, not least of which is cost. In recent years, however, the shelf-life of various food products has been extended by incorporating humectants into the products. These humectants can be used to produce softer foods having an intermediate level of moisture. Intermediate-moisture foods rely on a reduction of the availability of water in the food to prevent microbial growth and lengthen shelf life. Such availability of water in the food is commonly termed water activity ($A_\omega$). The $A_\omega$ of the food, or the partial vapor pressure of the water at the temperature of the food, can be readily determined by placing the sample in a sealed container and, upon reaching equilibrium, determining the relative humidity in the head space. In general, a low $A_\omega$, i.e., less than 0.90, indicates the existence of an environment in which growth of most microorganisms will be retarded.

U.S. Pat. No. 3,202,514 to Burgess et al., which discloses an intermediate moisture pet food, was one of the first to demonstrate the principle of extending the shelf-life of a food by controlling or altering the $A_\omega$. Burgess et al. shows how the $A_\omega$ of a food product can be maintained at a low level by a high sugar content. U.S. Pat. No. 4,146,652 to Kahn et al. discloses the substitution of polyhydric alcohols such as glycerine and sorbitol for sucrose. Glycerine and other polyhydric alcohols are known to also affect the texture of food bars. In U.S. Pat. No. 4,451,488, for example, Cook et al. used polyhydric alcohols to reduce the migration of moisture to the dry ingredients and thereby overcome the hard and crunchy texture found in earlier bars, while still retaining a low and $A_\omega$ and good flavor characteristics. Although other humectants besides glycerine and sorbitol are now known and widely used in the food industry, glycerine continues to be the humectant most widely used in intermediate-moisture food products. Prior art food bars may frequently contain, for example, as much as 25% glycerine or more, by weight.

Nutritional bars also now play a part in weight control programs. As part of such programs, people have turned to very low-carbohydrate diets in an effort to overcome their weight problems. Several such programs suggest limiting carbohydrate intake to 20–30 grams a day initially. Many people find such carbohydrate-restricted diets more appealing than calorie-restricted or starvation diets. Although there is considerable disagreement within the medical community regarding the use of low carbohydrate diets, public enthusiasm for and acceptance of these diets remains high.

Consumption of carbohydrates causes an elevation of blood glucose, which in turn triggers the secretion of insulin by the beta-cells of the pancreas. Insulin plays a crucial role in the regulation of blood glucose, lowering the concentration of blood glucose by: 1) increasing the capacity for transport of glucose from the bloodstream into cells, particularly of muscle and adipose tissue; 2) stimulating conversion of glucose to glycogen, a storage form of glucose; and 3) stimulating adipose cells to convert glucose to fat.

A very low intake of carbohydrate leads to low concentrations of insulin in the blood. As a result, liver glycogen is rapidly broken down to maintain blood glucose. This source is quickly depleted, however, and glucogenic amino acids from the breakdown of food and body proteins become the source of glucose for the body. Low insulin also encourages the breakdown of body fat stores and the oxidation of fatty acids from both dietary and body fats to provide energy. Fatty acids cannot be converted to glucose, however. Instead, when little glucose is available, the liver converts fatty acids to "ketone bodies" which many cells can use as an alternative fuel. In time, even the brain can adapt to using ketone bodies for energy. Ketone bodies appear in blood in elevated amounts (ketosis), and significant quantities are excreted in the urine (ketonuria). One explanation for the enhanced weight loss observed with ketogenic diets is the marked urinary excretion of ketone bodies that very low carbohydrate diets produce. These low-carbohydrate diets are thus referred to as "ketogenic diets."

Some scientists have argued that ketosis may be unhealthy or even dangerous. Ketogenic diets have been used for nearly 70 years, however. These diets have been helpful in treating children with difficult to control seizures, and have been shown to reduce the need for oral hypoglycemic agents in patients with type-2 diabetes. Ketogenic diets have also been used to treat obesity in Navy personnel and young college men. Reports have demonstrated that superior loss of body fat may be achieved by a ketogenic diet, compared to both an isocaloric (60% carbohydrate) mixed diet and to a total fast, and a greater weight loss was seen with a 30 gram carbohydrate diet as compared with isocaloric diets containing 60 and 104 grams of carbohydrate. These studies also showed good retention of lean body mass and no ill effects from the attendant ketosis.

Although the advisability of ketogenic diets may be disputed, there is a general consensus that the public health would benefit greatly from decreased consumption of cane sugar and other refined carbohydrates. Diabetics, for example, must continually monitor and restrict their carbohydrate intake, in order to maintain a normal blood glucose level. Many athletes, at certain points in their training, may also wish to limit carbohydrate intake, so as to avoid an increase in insulin secretion.

Thus, it is clear that there is both a need and a public demand for reduced carbohydrate food and nutritional products that may be suitable for persons wishing to reduce their intake of sugars and carbohydrates.

The term carbohydrate traditionally refers to polyhydroxy aldehydes or ketones, or substances that yield such compounds on hydrolysis. This traditional definition describes the sugars (e.g., sucrose, glucose, fructose, lactose), starches (e.g., of potatoes, rice, wheat flour, etc), and fiber (e.g., cellulose). Carbohydrates in human diets are divided into two major classifications: "available carbohydrates," consisting primarily of sugars and starches that can be digested to supply blood glucose either directly or after further metabolism; and "unavailable carbohydrates," that include indigestible matter, such as water-soluble pectin and water-insoluble cellulose.

According to current Food and Drug Administration (FDA) regulations, the total amount of carbohydrate in a food-stuff "shall be calculated by subtraction of the sum of the crude protein, total fat, moisture, and ash from the total weight of the food." 21 C.F.R. §101.9(c)(6). Thus, in order to comply with FDA requirements, the amount of carbohydrate listed on the label of a particular food or nutritional product may include ingredients that do not fit the traditional definition presented above. Such ingredients may include, for example, certain humectants, such as glycerine.

Glycerine (also known as glycerin, glycerol, or trihydroxypropane) is a polyhydric alcohol having the formula $C_3H_5(OH)_3$. It has a caloric value of 4.32 calories per gram. Glycerine has a sweet taste (about 0.6 times as sweet as cane sugar), and because of its palatability, it is frequently the humectant of choice in intermediate moisture food and nutrition products. Since the subtraction method will not account for glycerine in a proximate analysis of the fat, crude protein, moisture and ash, however, glycerine may be counted as a carbohydrate, regardless of the fact that its consumption will not significantly affect blood glucose or insulin levels. As a result of current labeling requirements, therefore, consumers seeking to restrict their carbohydrate intake may conclude that products containing large amounts of glycerine contain unacceptably high levels of carbohydrates.

There is a need, therefore, for a method for preparing intermediate moisture food or nutritional products that have an acceptable $A_\omega$, while not having an unacceptably high carbohydrate content, even when the carbohydrate content is measured by the subtraction method required by the FDA. Moreover, such intermediate moisture food or nutritional products need to exhibit aesthetic properties, such as taste, aroma and texture, that will be appealing to consumers. Simple reduction of carbohydrate content by reducing the concentration of sugars and humectants such as glycerine is generally not an option, since this may serve to increase the water activity, leading to an increased rate of microbial spoilage and a significant reduction in the shelf life of the product.

Disclosed herein is a solution to this problem: a method for reducing carbohydrate content in food and nutritional products, while maintaining a low water activity. The solution is provided by including in the food or nutritional product from about 1 to about 15% by weight betaine. The inclusion of betaine allows for a reduction in the amount of ingredients that may contribute to the carbohydrate content of the food or nutritional product, such as sugars and/or glycerine, without a concomitant increase in the rate of microbial spoilage. Additionally, food or nutritional products prepared according to the methods of the present invention, such as reduced carbohydrate food bars, have been found by tasting panels to be aesthetically pleasing, and may desirably exhibit the requisite stability and shelf-life that the commercial marketplace demands.

Betaine, also occasionally referred to as trimethylglycine, TMG, glycine betaine, oxyneurine, or 1-carboxy-N,N,N-trimethylmethanaminium hydroxide (chemical formula $C_5H_{11}NO_2$), occurs naturally in many plants and animals. Betaine may be available as anhydrous betaine (no water of crystallization) or betaine monohydrate (anhydrous betaine plus one water of hydration, equal to 86.7% anhydrous betaine plus 13.3% water). Betaine also forms an inner salt between its positively charged nitrogen atom and a negatively charged oxygen atom. It is available in the stable salt form as betaine hydrochloride, which carries 75% by weight anhydrous betaine and 25% hydrochloride. Betaine hydrochloride has thus been used as a source of chloride for increasing stomach hydrochloric acid secretion. Because of its high acid content, however, betaine hydrochloride is less preferred for use in the present invention.

Synthetic betaine is indistinguishable from natural material. As a substituted amino acid, on a proximate analysis any betaine in a food or nutritional product will be measured as part of the crude protein fraction. In human metabolism, betaine serves as a methyl donor, converting homocysteine to methionine, and has thus been used therapeutically as a treatment for homocysteinuria (500 to 1,000 mg daily). Betaine has also been suggested for use as a nutriceutical (e.g, 500 to 1,500 mg daily), for example to promote circulatory health, and to elevate levels of S-adenosyl-methionine and glutathione in the body.

As disclosed herein, intermediate moisture, low-sugar food and nutritional products having an acceptable $A_\omega$ may be prepared using betaine as a substitute for at least a part of the humectants, such as glycerine, that are commonly used in place of sugars. Since betaine is not a carbohydrate, food and nutritional products described herein may be particularly suitable for persons seeking to reduce their intake of carbohydrates. Furthermore, based upon the other known and proposed benefits of betaine consumption, such as promoting circulatory health and reducing homocysteine levels, the food or nutritional products described herein may be especially suitable for subjects wishing to avail themselves of such benefits.

The present invention is directed to these, as well as other, important ends.

SUMMARY OF THE INVENTION

The present invention is directed, in part, to novel food or nutritional products containing betaine. Specifically, in one embodiment, there are provided novel food or nutritional products which comprise, by weight, from about 2 to about 15% water, from about 1 to about 15% betaine, from about 5 to about 25% by weight of a pharmaceutically acceptable humectant, and from about 5 to about 90% protein other than betaine, based upon the total weight of the food or nutritional product. The $A_\omega$ in these food or nutritional products is maintained at a level no greater than about 0.90, to retard spoilage.

Another embodiment of the invention is directed to reduced carbohydrate food or nutritional products also having an $A_\omega$ no greater than about 0.90, wherein no more than about 30% of the calories are attributable to carbohydrates, as determined by the subtraction method. These products comprise, by weight: from about 1 to about 15% betaine; from about 5 to about 90% protein other than betaine; from about 2 to about 15% water; from about 5 to about 25% of a pharmaceutically acceptable humectant; and up to about 5% total sugars, based upon the total weight of the reduced carbohydrate food or nutritional product.

A further embodiment of the invention is directed to methods for lowering the $A_\omega$ of an intermediate-moisture food or nutritional product. The methods comprise including from about 1 to about 15% by weight betaine and from about 5 to about 25% by weight of a pharmaceutically acceptable humectant in the food or nutritional products. Suitable humectants may be selected from the group consisting of polyhydric alcohols, sugar alcohols, and mixtures thereof.

Yet another embodiment of the invention is directed to methods for retarding microbial spoilage of a food or nutritional product containing from 2 to about 15% by weight water. These methods comprise including in said food or nutritional product from about 1 to about 15% by weight betaine and from about 5 to about 25% by weight of a pharmaceutically acceptable humectant selected from the group consisting of polyhydric alcohols, sugar alcohols, and mixtures thereof.

These and other aspects of the invention will become more apparent from the following detailed description.

DETAILED DESCRIPTION OF THE INVENTION

The methods and compositions of the present invention are generally directed to the use of betaine in food or nutritional products. The term "food or nutritional product" refers to any protein containing consumable, such as food bars, sticks, pastes, cookies, cakes, pies, breads, cupcakes, muffins, biscuits, candies, prepared snack foods, and the like, either baked or not, intended to be eaten by a human or other animal. Food and nutritional products intended to be eaten by a human are preferred.

Preferably, the food or nutritional product is in the form of a food bar, as described, for example, in U.S. Pat. No. 4,451,488. The food bars may be formed by compression, may be extruded, or may be formed by another method known in the art. Other forms of food or nutritional products are also well known to those of ordinary skill in the art, and the methods of the present invention may easily be adapted to produce food or nutritional products in forms other than food bars.

Certain embodiments of the invention may be particularly well suited for subjects who are restricting their dietary intake of carbohydrates. Such subjects may include, for example, those suffering from Type I or Type II diabetes, those having elevated homocysteine levels and/or homocysteineuria, atheletes, and persons on ketogenic diets. As used herein, "carbohydrates" are measured by the subtraction method required by the FDA, as described above. The term "calories attributable to carbohydrates" refers to the caloric content of all compounds that would be classified as carbohydrates by this method. Specifically, calories that may be derived from compounds such as glycerine, which does not fit the traditional definition of a carbohydrate, are considered as "calories attributable to carbohydrates" in the present application. As used herein, the term "reduced carbohydrate food or nutritional product" refers to food or nutritional products in which no more than about 30% of the calories are attributable to "carbohydrates." Food or nutritional products in which no more than about 25% of the calories are attributable to carbohydrates may be preferred, with products in which no more than 20% of the calories are attributable to carbohydrates being more preferred. Products in which no more than 15% of the calories may be attributable to carbohydrates are most preferred.

Typically, betaine is incorporated into the food or nutritional product in the anhydrous form, although a certain percentage of the monohydrate form may also be present. The monohydrate form may also be produced during or after the manufacturing process, as the anhydrous betaine contacts water molecules. As noted above, the hydrochloride salt of betaine is generally not intentionally incorporated into the products of the present invention, although it may be possible for a limited amount of the hydrochloride salt of betaine to be present. Preferably, the food or nutritional products of the present invention comprise from about 1 to about 15% betaine, and all combinations and subcombinations of ranges and specific amounts therein. Preferably, the products comprise from about 2 to about 8% by weight betaine, with products comprising from about 3 to about 5% by weight betaine being even more preferred. The percentage of betaine in a food or nutritional product means the total amount of betaine in the product, exclusive of any water of hydration or associated hydrochloride that may be associated with the betaine.

The incorporation of betaine is of particular benefit in the production of food or nutritional products containing from 2 to about 15% water, and all combinations and subcombinations of ranges and specific amounts therein, based upon the total weight of the food or nutritional product. Food products containing from 2 to about 15% by weight water may be referred to herein as being "intermediate-moisture" food or nutritional products. Preferably, the water content in the food or nutritional products of the present invention is from about 7 to about 12% by weight, with products containing from about 8 to about 9% by weight water being even more preferred. The $A_\omega$ in these food or nutritional products is preferably no greater than about 0.90. Products in which the $A_\omega$ is no greater than about 0.75 are more preferred, due to their longer shelf-life, and products in which the $A_\omega$ is no greater than about 0.67 are even more preferred.

As noted above, the measurement of the $A_\omega$ of a food or nutritional product is a simple matter, well known to those of skill in the art. Water activity meters are readily available commercially, such as, for example, the AquaLab Water Activity Meter (Decagon Devices, Inc., Pullman, Wash.). AquaLab uses the chilled-mirror dewpoint technique to measure the $A_\omega$ of a sample. In an instrument that uses the dewpoint technique, the sample is equilibrated with the headspace of a sealed chamber that contains a mirror and a means of detecting condensation on the mirror. At equilibrium, the relative humidity of the air in the chamber is the same as the water activity of the sample. In the AquaLab, the mirror temperature is precisely controlled by a thermoelectric (Peltier) cooler. Detection of the exact point at which condensation first appears on the mirror is observed with a photoelectric cell. A beam of light is directed onto the mirror and reflected into a photodetector cell. The photodetector senses the change in reflectance when condensation occurs on the mirror. A thermocouple attached to the mirror then records the temperature at which condensation occurs. AquaLab then signals the operator by flashing a green LED and/or beeping. The final water activity and temperature of then sample is the displayed.

As disclosed herein, betaine may be used to reduce the $A_\omega$ of a food or nutritional product, and thereby reduce the incidence of microbial spoilage of the product. Microbial spoilage refers to the undesirable growth in a food or nutritional product of microorganisms, such as yeast, molds, and/or bacteria, that renders the product unacceptable or unfit for consumption. By reducing the $A_\omega$ of the product, the methods of the present invention may be used to retard microbial spoilage in intermediate moisture food or nutritional products. The term "retard microbial spoilage," as used herein, means that the onset of such spoilage may be delayed and/or the rate of growth of such microorganisms may be reduced. Thus, betaine may serve to extend the effective shelf-life of a food or nutritional product. The term "shelf-life," as used herein, refers to the length of time after a food or nutritional product is manufactured and/or packaged until it becomes unsuitable for sale, due to staleness, microbial spoilage, oxidation, separation of ingredients, or other causes. Accordingly, it has been found that by including betaine in a food or nutritional product, the shelf-life of that product may be extended beyond what it would be without the betaine.

The food or nutritional products of the present invention also generally contain protein. Although any betaine in the products may contribute to the crude protein fraction of a proximate analysis, as used herein, the term "protein" does not include betaine. Preferably, proximate analysis of the products reveals from about 5 to about 90% by weight protein other than betaine, based upon the total weight of the product, and all combinations and subcombinations of ranges and specific amounts therein. Protein amounts ranging from about 20 to about 75% by weight are preferred, and products containing from about 30 to about 60% by weight protein are more preferred. The protein in the food or nutritional products may be derived, at least in part, from a wide variety of optional ingredients, including nuts, fruit, grains, vegetable extracts, and the like. Additionally, purified protein products such as egg albumin, hydrolyzed soy protein, corn germ, gelatin, wheat germ, fish protein, bran protein, collagen hydrolysate, yeast extracts, whey protein isolates, milk proteins including any derivatives of casein and/or whey, and other protein products well known in the art may be included in the food or nutritional products. Various amino acids, either natural or synthetic, may also be incorporated into the products.

The food or nutritional products also may contain sucrose or other sugars. Preferably, the food or nutritional products contain no more than about 10% by weight sugars, based upon the total weight of the products, with products containing no more than about 7.5% by weight sugars being preferred. Products containing no more than about 5% by weight sugars are more preferred, with products containing no more than about 3.5% sugars being even more preferred. Products containing no more than about 2% sugars are the most preferred. The sugars may be incorporated into the products either as solids, or as sugar syrups, such as corn syrup, molasses, fruit extracts, honey, and other liquid preparations well known to those in the art. Other sweetening agents may also be employed, to improve the taste of the food or nutritional products. Such sweetening agents may include, for example, saccharin, aspartame, cyclamates, acesulfame-K, and sucralose.

As noted previously, although betaine may be used in place of a certain amount of the humectants commonly used to produce intermediate-moisture food and nutritional products, the products of the present invention frequently contain at least some pharmaceutically acceptable humectant, in addition to the betaine. Although it may be said that betaine may function as a humectant, as used herein, the term "humectant" does not include betaine. The term "pharmaceutically acceptable," as used herein, refers to materials that are generally not toxic or injurious to a patient when used in the food or nutritional products of the present invention. Suitable pharmaceutically acceptable humectants that may be used in the methods and products of the present invention may include, for example, polyhydroxy alcohols, such as glycerine and propylene glycol, sugar alcohols, such as sorbitol, mannitol, isomalt, maltitol, lactitol, and xylitol, and other known humectants such as polydextrose, triacetin and oxidized polyethylene. Frequently, the products may contain a combination of two or more humectants, for example a mixture of glycerine and propylene glycol. Additionally, several of the humectants (particularly the sugar alcohols mannitol, sorbitol, maltitol, lactitol and xylitol) listed above may frequently be present in a coating or frosting on the food product, for example as part of a chocolate coating on a food bar.

Preferably, the total amount of humectant in the food or nutritional product is no more than about 30% by weight, based upon the total weight of the product. More preferably, the total amount of humectant in the product is from about 5 to about 25% by weight, and all combinations and subcombinations of ranges and specific amounts therein. Amounts from about 8 to about 15% by weight are even more preferred. A particularly preferred embodiment of the invention utilizes a combination of glycerine and propylene glycol as the humectant in the main body of the food or nutritional product. In this embodiment, it is preferred that the product contain from about 5 to about 12% by weight glycerine and from about 1 to about 3% by weight propylene glycol.

The food or nutritional products of the present invention may also include a wide variety of edible oils, fats, and emulsifying agents well known to those of skill in the art. Various glycerides, including mono-, di-, and tri-glycerides, may be included, as well. A preferred class of di-glycerides is 1,3 diacylglycerol (DAG), as described, for example, in U.S. Pat. Nos. 6,025,348 and 6,139,897, to Goto, et al, which are incorporated herein in their entirety by reference. Particularly preferred are DAGs in which the constituent fatty acids comprise $C_{8\text{-}22}$ saturated fatty acids and unsaturated fatty acids. Products of the present invention preferably contain up to about 10% glycerides, with products containing, by weight, from about 2 to about 8% DAG, and all combinations and subcombinations of ranges and specific amounts therein, being preferred. Products containing from about 3 to about 7% DAG by weight are even more preferred.

The food or nutritional products of the present invention may also include a wide variety of natural and artificial flavorings and colorants well known to those of ordinary skill in the art. Other optional ingredients include various vitamins and mineral supplements commonly added to food products of this type, and other nutriceuticals, chemopreventive agents, and the like, well known to those skilled in the art may also be included. Various preservatives, emulsifying agents, anti-oxidants and fillers may also be present.

The invention is further demonstrated in the following examples, which are for provided for purposes of illustration and are not intended to limit the scope of the present invention in any way.

EXAMPLES

Example I

Food bars containing the following ingredients were prepared:

| FOOD ITEM | % WEIGHT |
| --- | --- |
| Collagen Hydrolysate | 15.37% |
| Calcium Caseinate | 8.89% |
| Isolated Soy Protein | 5.46% |
| Peanut Flour | 7.41% |
| Whey Protein Isolate | 5.56% |
| Betaine | 2.96% |
| Glycerine 99.5% U.S.P. | 9.07% |
| Propylene Glycol | 2.04% |
| Natural Peanut Butter-Salted, Dark Roast | 4.63% |
| 1,3 Diacylglycerol (DAG) | 4.35% |
| Distilled Water | 9.07% |
| Sucralose, liquid | 0.28% |
| Chocolate Peanut Coating | 16.67% |
| Vit/Min Premix | 1.85% |
| Magnesium Oxide | 0.46% |
| Tricalcium Phosphate | 2.87% |
| Citric Acid Anhydrous | 0.65% |
| Salt | 0.37% |
| Flavorings | 2.04% |

All liquid ingredients except the coating were mixed together separate from the dry ingredients, to form a syrup base. The dry ingredients were also blended together, and the syrup base was added to the mixed dry ingredients to form a dough. The dough was kneaded until all ingredients were well blended. The bars were pressed and formed, then coated. The bars had an excellent soft, chewy texture, with no off flavors from the humectants. The $A_\omega$ was measured at 0.67. The bars contained 245.79 total calories, with 22% attributable to carbohydrates, as determined by the subtraction method. Total protein, including betaine measured 41%. Protein other than betaine measured 38.7%. Sugars measured less than 2% by weight. The bars were expected to have an excellent shelf-life, based on the low $A_\omega$.

Example II

Food bars containing the following food ingredients were prepared:

| FOOD ITEM | % WEIGHT |
| --- | --- |
| Collagen Hydrolysate | 10.19% |
| Calcium Caseinate | 10.19% |
| Isolated Soy Protein | 9.91% |
| Whey Protein Isolate | 6.48% |
| Betaine | 7.41% |
| Glycerine 99.5% U.S.P. | 7.41% |
| Propylene Glycol | 1.85% |
| Dried Ground Filberts/Hazelnuts | 5.56% |
| Dry Roasted Filberts/Hazelnuts-Unsalted | 6.48% |
| 1,3 Diacylglycerol (DAG) | 3.70% |
| Distilled Water | 9.26% |
| Sucralose, liquid | 0.28% |
| Dark Chocolate Coating | 14.81% |
| Vit/Min Premix | 1.11% |
| Magnesium Oxide | 0.46% |
| Tricalcium Phosphate | 2.87% |
| Flavorings | 2.03% |

The bars were prepared as in Example 1. The bars had an excellent soft, chewy texture, with no off flavors from the humectants. The $A_\omega$ was less than 0.67. The bars contain 208.68 total calories, with only 19% attributable to carbohydrates, by the subtraction method. Total protein, including the betaine, measured 40.9%. Protein other than betaine measured 35.7%. Sugars measured less than 2% by weight. The bars were expected to have an excellent shelf-life, based on the low $A_\omega$.

Example III

To demonstrate the effect of betaine on lowering water activity, two experimental bars were made, each containing the same amount of protein, glycerine, water and fat. The second bar contained 3% betaine. Flavorings, vitamins and minerals and coating were omitted to simplify the process:

| Ingredient | Bar 1 | Bar 2 |
| --- | --- | --- |
| Calcium Caseinate | 15 g | 15 g |
| Collagen Hydrolysate | 10 g | 10 g |
| Glycerine | 9 g | 9 g |
| Water | 9 g | 9 g |
| Oil | 2 g | 2 g |
| Betaine | 0 g | 1.35 g (3.0%) |
| Total Weight | 45 g | 46.35 g |
| $A_\omega$ | .754 | .720 |

This example shows that the inclusion of betaine in the composition acts to lower the $A_\omega$.

The disclosures of each patent, patent application and publication cited or described in this document are hereby incorporated herein by reference, in their entirety.

Various modifications of the invention, in addition to those described herein, will be apparent to those skilled in the art from the foregoing description. Such modifications are also intended to fall within the scope of the appended claims.

What is claimed is:

1. A food or nutritional product comprising, by weight, from about 2 to about 15% water, from about 1 to about 15% betaine, from about 5 to about 25% by weight of a pharmaceutically acceptable humectant, and from about 5 to about 90% protein other than betaine, based upon the total weight of the food or nutritional product, wherein the $A_\omega$ of said food or nutritional product is no greater than about 0.90.

2. A food or nutritional product according to claim 1 wherein the $A_\omega$ of said food or nutritional product is no greater than about 0.75.

3. A food or nutritional product according to claim 2 wherein the $A_\omega$ of said food or nutritional product is no greater than about 0.67.

4. A food or nutritional product according to claim 1 comprising from about 2 to about 8% by weight betaine.

5. A food or nutritional product according to claim 4 comprising from about 3 to about 5% by weight betaine.

6. A food or nutritional product according to claim 1 comprising from about 7 to about 12% by weight water.

7. A food or nutritional product according to claim 6 comprising from about 8 to about 9% by weight water.

8. A food or nutritional product according to claim 1 comprising from about 25 to about 75% by weight protein other than betaine.

9. A food or nutritional product according to claim 8 comprising from about 30 to about 60% by weight protein other than betaine.

10. A food or nutritional product according to claim 1, wherein said food or nutritional product is in the form of a bar.

11. A food or nutritional product according to claim 1, wherein said pharmaceutically acceptable humectant is selected from the group consisting of glycerine, propylene glycol, and mixtures thereof.

12. A food or nutritional product according to claim 11, wherein said humectant comprises glycerine.

13. A food or nutritional product according to claim 11, wherein said humectant comprises a mixture of glycerine and propylene glycol.

14. A food or nutritional product according to claim 1, comprising from about 8 to about 15% by weight of said humectant.

15. A food or nutritional product according to claim 1 comprising, by weight, from about 8 to about 9% water, from about 3 to about 5% betaine, and from about 30 to about 60% protein other than betaine, based upon the total weight of the food or nutritional product, wherein the $A_\omega$ of said food or nutritional product is no greater than about 0.67.

16. A food or nutritional product according to claim 15 comprising from about 5 to about 12% by weight glycerine and from about 1 to about 3% by weight propylene glycol.

17. A food or nutritional product according to claim 1 further comprising a mono- or di-glyceride.

18. A food or nutritional product according to claim 17, wherein said mono- or di-glyceride is diacylglycerol.

19. A food or nutritional product according to claim 16 further comprising from about 2 to about 8% diacylglycerol.

20. A reduced carbohydrate food or nutritional product having an $A_\omega$ no greater than about 0.90 comprising, by weight:
   from about 1 to about 15% betaine;
   from about 2 to about 15% water;
   from about 5 to about 25% of a pharmaceutically acceptable humectant;
   from about 5 to about 90% protein other than betaine; and
   up to about 5% total sugars,
based upon the total weight of the food or nutritional product, wherein no more than about 30% of the calories in said reduced carbohydrate food or nutritional product are attributable to carbohydrates.

21. A food or nutritional product according to claim 20 wherein the $A_\omega$ of said food or nutritional product is no greater than about 0.75.

22. A food or nutritional product according to claim 21 wherein the $A_\omega$ of said food or nutritional product is no greater than about 0.67.

23. A food or nutritional product according to claim 20 comprising from about 2 to about 8% by weight betaine.

24. A food or nutritional product according to claim 23 comprising from about 3 to about 5% by weight betaine.

25. A food or nutritional product according to claim 20 comprising from about 7 to about 12% by weight water.

26. A food or nutritional product according to claim 25 comprising from about 8 to about 9% by weight water.

27. A food or nutritional product according to claim 20 comprising from about 20 to about 75% by weight protein other than betaine.

28. A food or nutritional product according to claim 27 comprising from about 30 to about 60% by weight protein other than betaine.

29. A food or nutritional product according to claim 20 comprising, by weight:
   from about 3 to about 5% betaine;
   from about 8 to about 9% water; and
   from about 30 to about 60% protein other than betaine,
based upon the total weight of the food or nutritional product, wherein the $A_\omega$ of said food or nutritional product is no greater than about 0.67.

30. A food or nutritional product according to claim 20, wherein said food or nutritional product is in the form of a bar.

31. A food or nutritional product according to claim 20, wherein said pharmaceutically acceptable humectant is selected from the group consisting of glycerine, propylene glycol, and mixtures thereof.

32. A food or nutritional product according to claim 31, wherein said pharmaceutically acceptable humectant comprises glycerine.

33. A food or nutritional product according to claim 31, wherein said pharmaceutically acceptable humectant comprises a mixture of glycerine and propylene glycol.

34. A food or nutritional product according to claim 20, comprising from about 8 to about 15% by weight of said pharmaceutically acceptable humectant.

35. A food or nutritional product according to claim 34 comprising from about 5 to about 12% by weight glycerine and from about 1 to about 3% by weight propylene glycol.

36. A food or nutritional product according to claim 20 further comprising a mono- or di-glyceride.

37. A food or nutritional product according to claim 36, wherein said mono- or di-glyceride comprises diacylglycerol.

38. A method of lowering the $A_\omega$ of an intermediate-moisture food or nutritional product, said method comprising including in said food or nutritional product from about 1 to about 15% by weight betaine and from about 5 to about 25% by weight of a pharmaceutically acceptable humectant selected from the group consisting of polyhydric alcohols, sugar alcohols, and mixtures thereof.

39. A method according to claim 38, wherein the $A_\omega$ of said intermediate-moisture food or nutritional product is no greater than about 0.90.

40. A method according to claim 39 wherein the $A_\omega$ of said intermediate-moisture food or nutritional product is no greater than about 0.75.

41. A method according to claim 40 wherein the $A_\omega$ of said intermediate-moisture food or nutritional product is no greater than about 0.67.

42. A method according to claim 38 comprising including from about 2 to about 8% by weight betaine in said food or nutritional product.

43. A method according to claim 42 comprising including from about 3 to about 5% by weight betaine in said food or nutritional product.

44. A method according to claim 38 wherein said food or nutritional product comprises from about 7 to about 12% by weight water.

45. A method according to claim 44 wherein said food or nutritional product comprises from about 8 to about 9% by weight water.

46. A method according to claim 38 wherein said food or nutritional product comprises from about 25 to about 75% by weight protein other than betaine.

47. A method according to claim 46 wherein said food or nutritional product comprises from about 30 to about 60% by weight protein other than betaine.

48. A method according to claim 38, wherein said food or nutritional product is in the form of a bar.

49. A method according to claim 38, wherein said polyhydric alcohol is selected from the group consisting of glycerine, propylene glycol, and mixtures thereof.

50. A method according to claim 49, wherein said polyhydric alcohol comprises glycerine.

51. A method according to claim 38, comprising including from about 8 to about 15% by weight of said pharmaceutically acceptable humectant in said food or nutritional product.

52. A method according to claim 51, comprising including from about 5 to about 12% by weight glycerine and from about 1 to about 3% by weight propylene glycol in said food or nutritional product.

53. A method according to claim 52, comprising including from about 3 to about 5% by weight betaine in said food or nutritional product.

54. A method for retarding microbial spoilage of a food or nutritional product containing from 2 to about 15% by weight water, said method comprising including in said food or nutritional product from about 1 to about 15% by weight betaine and from about 5 to about 25% by weight of a pharmaceutically acceptable humectant selected from the group consisting of polyhydric alcohols, sugar alcohols, and mixtures thereof.

55. A method according to claim 54, wherein the $A_\omega$ of said intermediate-moisture food or nutritional product is no greater than about 0.90.

56. A method according to claim 55 wherein the $A_\omega$ of said intermediate-moisture food or nutritional product is no greater than about 0.75.

57. A method according to claim 56 wherein the $A_\omega$ of said intermediate-moisture food or nutritional product is no greater than about 0.67.

58. A method according to claim 55 comprising including from about 2 to about 8% by weight betaine in said food or nutritional product.

59. A method according to claim 58 comprising including from about 3 to about 5% by weight betaine in said food or nutritional product.

60. A method according to claim 54 wherein said food or nutritional product comprises from about 7 to about 12% by weight water.

61. A method according to claim 60 wherein said food or nutritional product comprises from about 8 to about 9% by weight water.

62. A method according to claim 54 wherein said food or nutritional product comprises from about 25 to about 75% by weight protein other than betaine.

63. A method according to claim 62 wherein said food or nutritional product comprises from about 30 to about 60% by weight protein other than betaine.

64. A method according to claim 54, wherein said food or nutritional product is in the form of a bar.

65. A method according to claim 54, wherein said polyhydric alcohol is selected from the group consisting of glycerine, propylene glycol, and mixtures thereof.

66. A method according to claim 65, wherein said polyhydric alcohol comprises glycerine.

67. A method according to claim 54, comprising including from about 8 to about 15% by weight of said pharmaceutically acceptable humectant in said food or nutritional product.

68. A method according to claim 67, comprising including from about 5 to about 12% by weight glycerine and from about 1 to about 3% by weight propylene glycol in said food or nutritional product.

69. A method according to claim 68, comprising including from about 3 to about 5% by weight betaine in said food or nutritional product.

* * * * *